US012793360B2

(12) United States Patent
Kimura et al.

(10) Patent No.: US 12,793,360 B2
(45) Date of Patent: Nov. 10, 2026

(54) GUIDE IMAGE MANAGEMENT APPARATUS

(71) Applicant: NTT DOCOMO, INC., Tokyo (JP)

(72) Inventors: Shinji Kimura, Chiyoda-ku (JP); Hironobu Fujino, Chiyoda-ku (JP); Taishi Yamamoto, Chiyoda-ku (JP); Osamu Goto, Chiyoda-ku (JP); Yuichi Ichikawa, Chiyoda-ku (JP); Takurou Kuribara, Chiyoda-ku (JP); Kengo Matsumoto, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 93 days.

(21) Appl. No.: 18/848,782

(22) PCT Filed: Feb. 28, 2023

(86) PCT No.: PCT/JP2023/007342
§ 371 (c)(1),
(2) Date: Sep. 19, 2024

(87) PCT Pub. No.: WO2023/199627
PCT Pub. Date: Oct. 19, 2023

(65) Prior Publication Data
US 2025/0209751 A1 Jun. 26, 2025

(30) Foreign Application Priority Data
Apr. 12, 2022 (JP) ................................. 2022-065581

(51) Int. Cl.
*G06T 19/00* (2011.01)
*G06V 10/74* (2022.01)

(52) U.S. Cl.
CPC .......... *G06T 19/006* (2013.01); *G06V 10/761* (2022.01)

(58) Field of Classification Search
CPC ..... G06T 19/00; G06T 19/003; G06T 19/006; G06T 3/14; G06V 10/761; G06V 20/20;
(Continued)

(56) References Cited

U.S. PATENT DOCUMENTS 11,126,846 B2 * 9/2021 Neumann .............. G06V 20/20
2011/0161875 A1 * 6/2011 Kankainen ......... H04N 1/00323 715/810
2019/0158774 A1 * 5/2019 Igarashi .................. G06T 19/00

FOREIGN PATENT DOCUMENTS

JP 2009-251831 A 10/2009

OTHER PUBLICATIONS

International Search Report mailed on May 23, 2023 in PCT/JP2023/007342 filed on Feb. 28, 2023 (4 pages, with English translation).

* cited by examiner

*Primary Examiner* — Nelson M Rosario
(74) *Attorney, Agent, or Firm* — Oblon, McClelland, Maier & Neustadt, L.L.P.

(57) ABSTRACT

A guide image management apparatus includes a manager configured to manage one or more guide images in association with a virtual object virtually placed in a real space, the one or more guide images being each obtained by capturing an area of the real space including a location of the virtual object, and a communication controller configured to: cause a communication apparatus to transmit a first guide image of the one or more guide images to a user apparatus; and cause the communication apparatus to receive, from the user apparatus, a captured image generated by the user apparatus executing image capture, in which the manager is configured to manage the captured image as a new guide image when the captured image satisfies a registration condition.

7 Claims, 12 Drawing Sheets

(58) Field of Classification Search
CPC ......... G06V 20/63; G06F 3/013; G06F 3/048; G06F 3/011; G06F 3/0481; G06F 3/14; G06F 16/29; G06F 16/532; G06F 16/5846; G06F 16/5866; H04N 23/62; H04N 23/63; H04N 5/44504; H04N 1/00323; G01C 21/20; G01C 21/3647; G01C 21/005; G01C 21/206; G01C 21/3602; G01C 21/3679; G09G 2340/12; G09G 2340/125; G09G 2354/00; G06N 20/00; G06Q 10/02; G06Q 30/0623; G06Q 30/0641; G06Q 30/0643
See application file for complete search history.

DB1

| VIRTUAL OBJECT ID | VIRTUAL OBJECT DATA | REFERENCE POINT COORDINATES | RELATIVE COORDINATES | ADDITIONAL DATA |
|---|---|---|---|---|
| V001 | as621.fbx | (aaa, bbb, ccc) | (0, 0, 100) | rt552.jpeg |
| V002 | hw951.obj | (ggg, fff, qqq) | (10, 20, 30) | se696.jpeg |
| ... | ... | ... | ... | ... |

FIG. 8

DB2

R3

| GUIDE IMAGE ID | VIRTUAL OBJECT ID | GUIDE IMAGE | CAPTURE PARAMETER | TRANSMISSION CONDITION | ACQUISITION DATE AND TIME |
|---|---|---|---|---|---|
| G001 | V001 | 001.jpeg | LOCATION (x1, y1, z1) ORIENTATION (a1, b1) | LOCATION (x11,y11,z11) RADIUS 50 m | 2022/1/12 10 : 10 |
| G002 | V001 | 002.jpeg | LOCATION (x2, y2, z2) ORIENTATION (a2, b2) | LOCATION (x11, y11, z11) RADIUS 50 m | 2022/2/15 13 : 15 |
| G003 | V002 | 003.jpeg | LOCATION (x3, y3, z3) ORIENTATION (a3, b3) | LOCATION (x33, y33, z33) RADIUS 15 m | 2022/3/1 14:20 |
| G004 | V003 | 004.jpeg | LOCATION (x4, y4, z4) ORIENTATION (a4, b4) | LOCATION (x44, y44, z44) RADIUS 30 m | 2022/2/20 15:33 |
| ... | ... | ... | ... | ... | ... |
| G010 | V007 | 007.jpeg | LOCATION (x7, y7, z7) ORIENTATION (a7, b7) | LOCATION (x77, y77, z77) RADIUS 30 m | 2022/2/25 17:55 |

FIG. 12

DB2

| GUIDE IMAGE ID | VIRTUAL OBJECT ID | GUIDE IMAGE | CAPTURE PARAMETER | TRANSMISSION CONDITION | ACQUISITION DATE AND TIME |
|---|---|---|---|---|---|
| G001 | V001 | 001.jpeg | LOCATION (x1, y1, z1) ORIENTATION (a1, b1) | LOCATION (x11,y11,z11) RADIUS 50 m | 2022/1/12 10 : 10 |
| G002 | V001 | 002.jpeg | LOCATION (x2, y2, z2) ORIENTATION (a2, b2) | LOCATION (x11, y11, z11) RADIUS 50 m | 2022/2/15 13 : 15 |
| G004 | V003 | 004.jpeg | LOCATION (x4, y4, z4) ORIENTATION (a4, b4) | LOCATION (x44, y44, z44) RADIUS 30 m | 2022/2/20 15:33 |
| ... | ... | ... | ... | ... | ... |
| G010 | V007 | 007.jpeg | LOCATION (x7, y7, z7) ORIENTATION (a7, b7) | LOCATION (x77, y77, z77) RADIUS 30 m | 2022/2/25 17:55 |
| G011 | V002 | 011.jpeg | LOCATION (x11, y11, z11) ORIENTATION (a11, b11) | LOCATION (x33, y33, z33) RADIUS 15 m | 2022/3/25 16:00 |

R11

GUIDE IMAGE MANAGEMENT APPARATUS

TECHNICAL FIELD

The present invention relates to guide image management apparatuses.

BACKGROUND ART

Patent Document 1 discloses a guide providing system for guiding a user in a virtual space. This guide providing system generates scene graphs. In a scene graph, multiple objects in the virtual space appear as nodes. In the scene graph, hierarchical interrelationships between the objects are described. The guide providing system determines whether a difference between a current scene graph and a previous scene graph is greater than or equal to a fixed difference. When the difference is greater than or equal to the fixed difference, the guide providing system stores the current scene graph. The guide providing system provides the user with a recommended area to visit and route information based on the scene graph and a visit history of the user.

Related Art Document

Patent Document

Patent Document 1:
Japanese Patent Application Laid-Open Publication No. 2009-251831

SUMMARY OF THE INVENTION

Problem to be Solved by the Invention

The conventional guide providing system provides a recommended area to visit and route information; however, it cannot provide a guide image representing a location of a virtual object placed in a virtual space. In particular, when an environment of an area in which a virtual object is placed is changed, the conventional guide providing system has a disadvantage of being unable to provide a user with a new guide image.

Means for Solving Problem

A guide image management apparatus according to this disclosure includes a manager configured to manage one or more guide images in association with a virtual object virtually placed in a real space, the one or more guide images being each obtained by capturing an area of the real space including a location of the virtual object, and a communication controller configured to: cause a communication apparatus to transmit a first guide image of the one or more guide images to a user apparatus; and cause the communication apparatus to receive, from the user apparatus, a captured image generated by the user apparatus executing image capture, in which the manager is configured to manage the captured image as a new guide image when the captured image satisfies a registration condition.

Effect of Invention

According to this disclosure, when an environment of an area in which a virtual object is placed is changed, it is possible to provide a new guide image representing a location of the virtual object.

BRIEF DESCRIPTION OF THE DRAWINGS

FIG. 8 is an explanatory diagram showing an example of a data structure of a second database DB2.

FIG. 12 is an explanatory diagram showing an example of contents stored in an updated second database DB2.

MODES FOR CARRYING OUT THE INVENTION

1: Embodiment

With reference to FIG. 1 to FIG. 12, an information processing system 1 will be described.

1-1: Configuration of Embodiment 1-1-1: Overall Configuration

Figure 1:
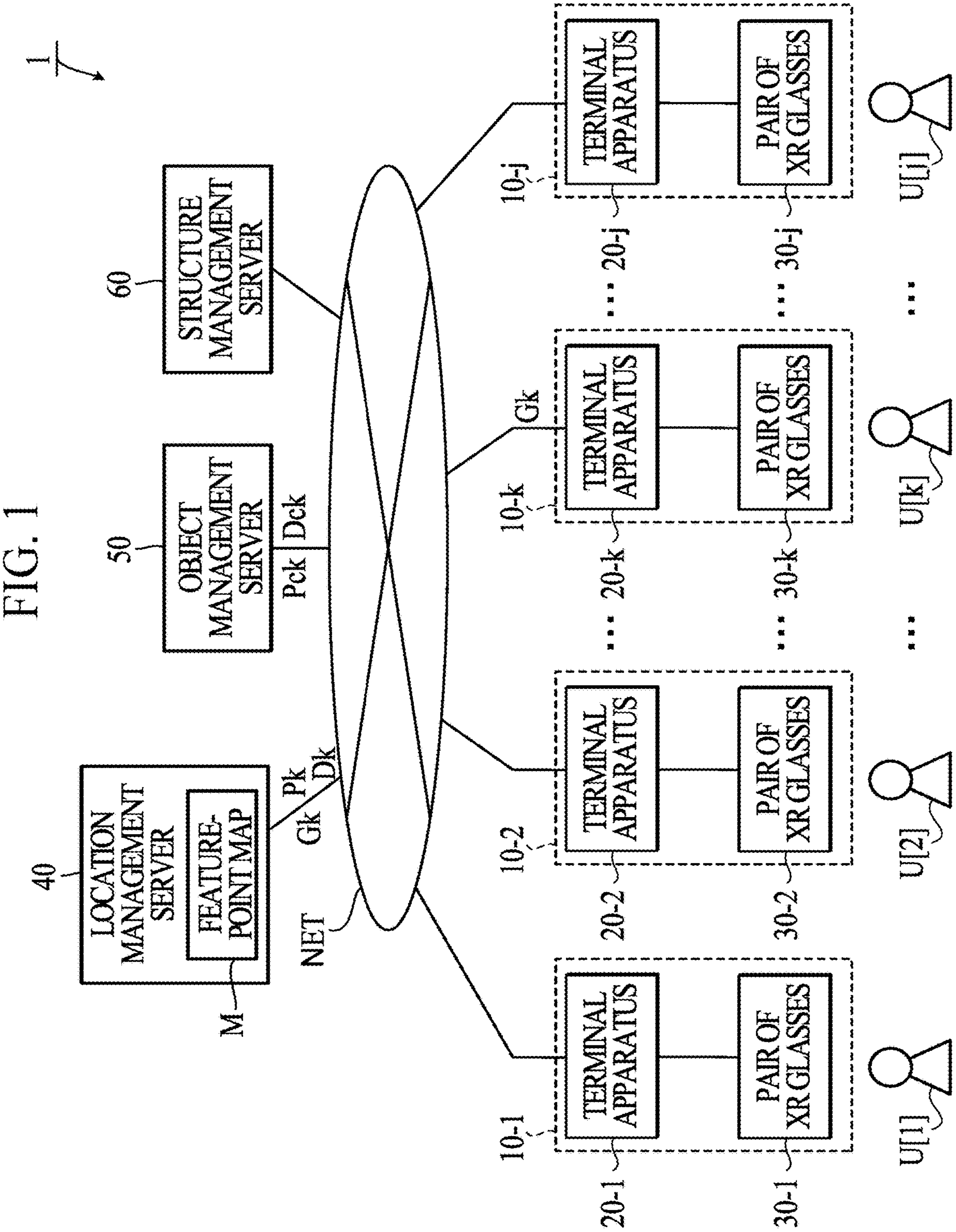
FIG. 1 is a diagram showing an overall configuration of an information processing system 1 according to an embodiment.

FIG. 1 is a block diagram showing an overall configuration of the information processing system 1. As shown in FIG. 1, the information processing system 1 includes user apparatuses 10-1, 10-2 . . . 10-*k* . . . 10-*j*, a location management server 40 configured to manage locations of the user apparatuses, an object management server 50 configured to manage virtual objects, and a structure management server 60 configured to manage space structure data. Here, j is a freely selected integer greater than or equal to one, and k is a freely selected integer greater than or equal to one, and less than or equal to j. The user apparatus 10-*k* includes a terminal apparatus 20-*k* and a pair of XR glasses 30-*k*. In this embodiment, the user apparatuses 10-1, 10-2 . . . 10-*k* . . . 10-*j* have the same configuration. Thus, terminal apparatuses 20-1, 20-2 . . . 20-*k* . . . 20-*j* have the same configuration, and pairs of XR glasses 30-1, 30-2 . . . 30-*k* . . . 30-*j* have the same configuration. However, the information processing system 1 may include a terminal apparatus having a configuration that is not the same as that of another terminal apparatus, or a pair of XR glasses having a configuration that is not the same as that of another pair of XR glasses.

In the information processing system 1, the location management server 40 and the user apparatus 10-*k* are connected to, and are communicable with, each other via a communication network NET. The object management server 50 and the user apparatus 10-*k* are connected to, and are communicable with, each other via the communication network NET. The object management server 50 and the structure management server 60 are connected to, and are communicable with, each other via the communication network NET. The terminal apparatus 20-*k* and the pair of XR glasses 30-*k* are connected to, and are communicable with, each other. In FIG. 1, a user U [k] uses the user apparatus 10-*k*. Users U[1], U[2] . . . . U[k−1], U[k+1] . . . . U[j] use the user apparatus 10-1, the user apparatus 10-2 . . . a user apparatus 10-*k*−1, a user apparatus 10-*k*+1 . . . the user apparatus 10-*j*, respectively.

The terminal apparatus 20-*k* functions as a relay apparatus configured to relay communication between the pair of XR glasses 30-*k* and the location management server 40 and communication between the pair of XR glasses 30-*k* and the object management server 50. The terminal apparatus 20-*k* is constituted of, for example, a smartphone or a tablet device.

Figure 2A:
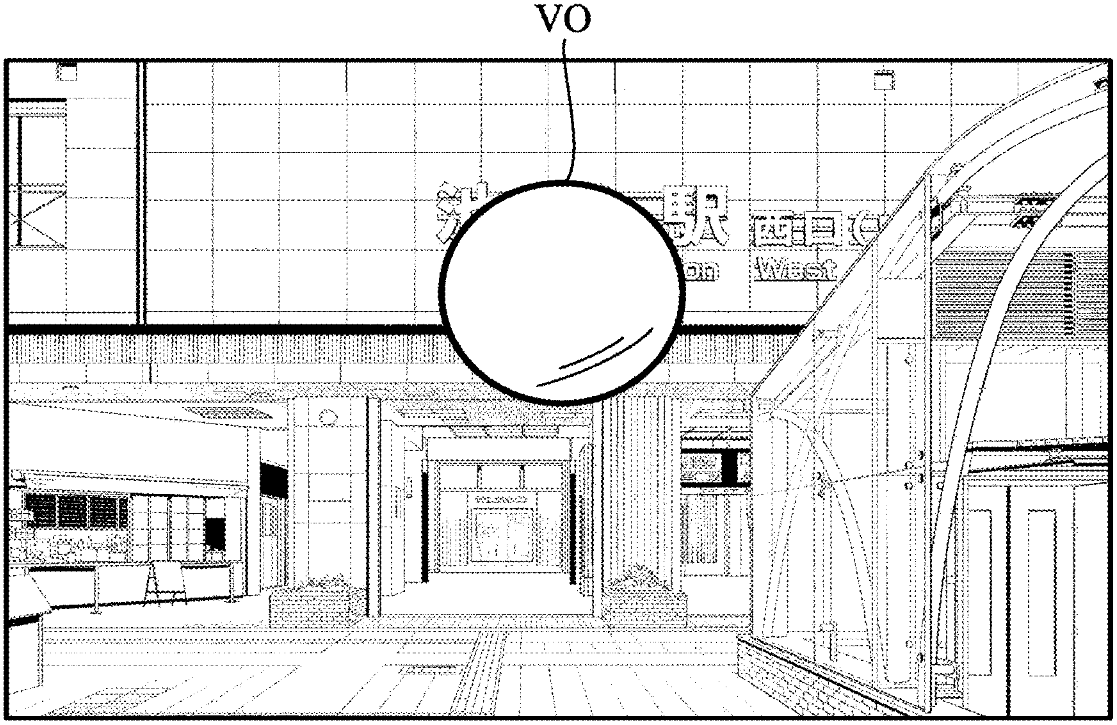
FIG. 2A is an explanatory diagram showing an example of a mixed reality space visually recognized by a user U[k] through a pair of XR glasses 30-*k*.

The pair of XR glasses 30-*k* is to be worn on the head of the user U[k]. The pair of XR glasses 30-*k* is a see-through type of glasses that can display a virtual object. The user U[k] visually recognizes a real space through the pair of XR glasses 30-*k* and visually recognizes the virtual object through the pair of XR glasses 30-*k*. The virtual object is placed at a location in a virtual space in association with a location in the real space. The user U[k] uses the pair of XR glasses 30-*k* to recognize a mixed reality space in which the real space and the virtual space are mixed together. FIG. 2A is an explanatory diagram showing an example of the mixed reality space visually recognized by the user U[k] through the pair of XR glasses 30-*k*. A virtual object VO shown in FIG. 2A has a spherical shape. The virtual object VO may be represented in three dimensions or may be represented in two dimensions. The virtual object VO represented in two dimensions may be displayed in a still image or in a video, for example.

Figure 2B:
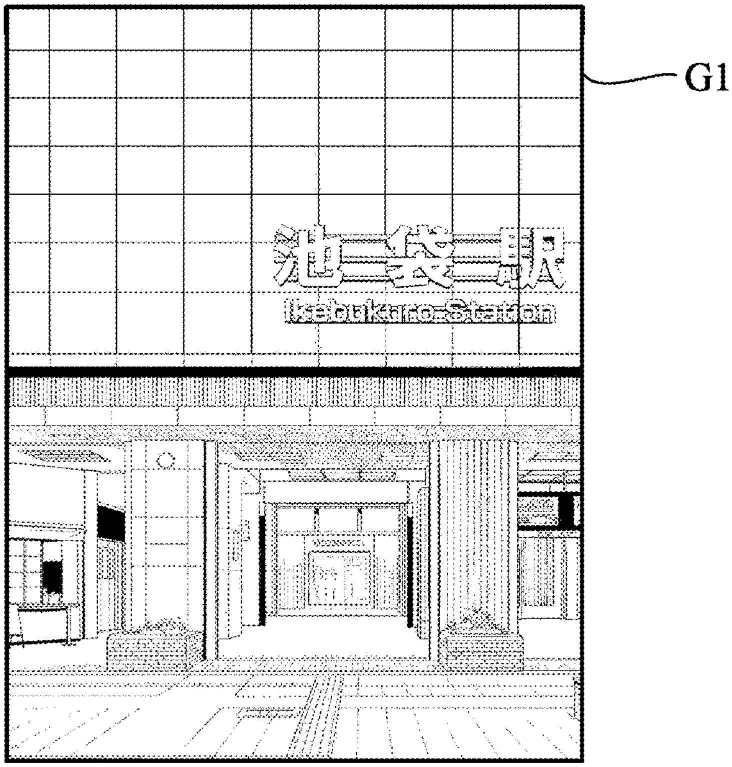
FIG. 2B is an explanatory diagram showing an example of a guide image G1 corresponding to a virtual object VO shown in FIG. 2A.
Figure 2C:
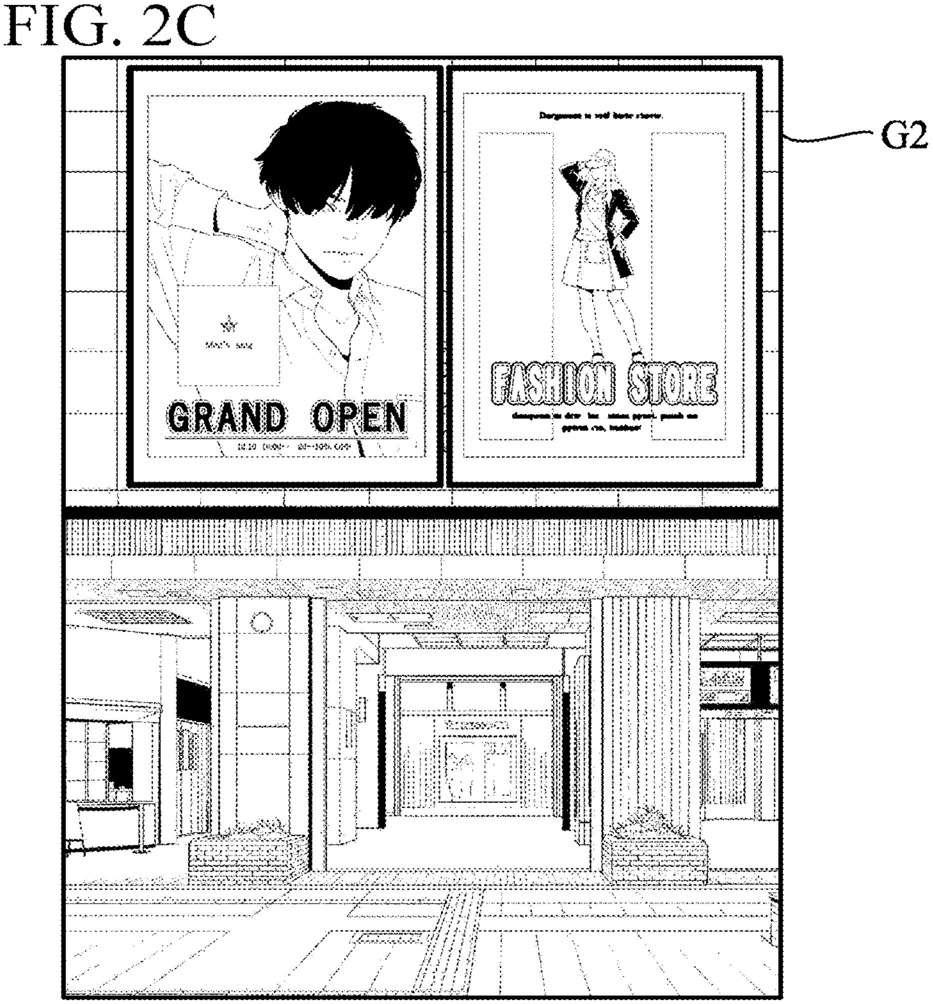
FIG. 2C is an explanatory diagram showing an example of a guide image G2.

A virtual object may be placed permanently or may be placed for only a limited period during which an event is held. In addition, an area in which the virtual object is to be placed is limited. In a service in which a virtual object is used, notifying the user U[k] of an area in which the virtual object is placed contributes to improvement in convenience of the service. Thus, the object management server 50 transmits a guide image obtained by capturing an area of the real space including a location of a virtual object virtually placed in the real space, as a first guide image, to the user apparatus 10-*k*. FIG. 2B is an explanatory diagram showing a guide image G1, which is an example of the guide image. The guide image G1 is a guide image corresponding to the virtual object VO shown in FIG. 2A. When this guide image G1 is displayed by the user apparatus 10-*k*, the user U[k] can recognize that the virtual object VO is virtually placed at an entrance of Ikebukuro Station. Thus, the user U[k] can search for the virtual object VO by using the guide image G1 as a clue.

As described above, the guide image is obtained by capturing an area of the real space including a location of a virtual object. However, in the real space, a new structure may be disposed in an area around the virtual object, or a structure may be removed from the area. When an environment of the area around the virtual object is changed as described above, it is different for the user U[k] to search for the virtual object VO by using the guide image as a clue. Thus, the information processing system 1 updates the guide image in accordance with a change in the environment of the area around the virtual object. For example, when a new structure is disposed in an area around the entrance of Ikebukuro Station, the guide image G1 shown in FIG. 2B is updated to a new guide image G2 shown in FIG. 2C, for example. In this example, two posters are disposed over the entrance. Since the two posters are captured in the new guide image G2, the user U[k] can search for the virtual object VO by using the new guide image G2 as a clue.

The pair of XR glasses 30-*k* shown in FIG. 1 includes a capturing device configured to capture the outside world. The capturing device executes image capture to generate a captured image Gk. The captured image Gk is transmitted to the location management server 40 via the terminal apparatus 20-*k*. The location management server 40 receives the captured image Gk transmitted from the terminal apparatus 20-*k*. The location management server 40 determines a location of the pair of XR glasses 30-*k* and an orientation of the pair of XR glasses 30-*k* based on the captured image Gk. The location management server 40 transmits location information Pk indicative of the determined location and orientation information Dk indicative of the determined orientation back to the terminal apparatus 20-*k*.

The location management server 40 stores a feature-point map M. The feature-point map M is data indicative of a plurality of feature points in a three-dimensional global coordinate system. The feature-point map M is generated, for example, by extracting a plurality of feature points from images obtained by a stereo camera capturing an area around an area in which a virtual object is to be placed. In the feature-point map M, locations in the real space are represented in the global coordinate system.

The location management server 40 extracts a plurality of feature points from the captured image Gk. The location management server 40 compares the extracted plurality of feature points with the plurality of feature points stored in the feature-point map M to determine a capture location at which the image capture is executed so as to generate the captured image Gk, and a capture orientation in which the image capture is executed so as to generate the captured image Gk. The location management server 40 transmits the location information Pk indicative of the capture location and the orientation information Dk indicative of the capture orientation back to the terminal apparatus 20-*k*.

The pair of XR glasses 30-*k* periodically transmits captured images Gk individually to the location management server 40 to periodically acquire pairs of location information Pk and orientation information Dk individually. The pair of XR glasses 30-*k* tracks local coordinates of the pair of XR glasses 30-*k* in real time. The pair of XR glasses 30-*k* uses the location information Pk and the orientation information Dk acquired from the location management server 40 to correct a location and orientation of the pair of XR glasses 30-*k* in real time. This correction allows the pair of XR glasses 30-*k* to recognize in real time a location and orientation of the pair of XR glasses 30-*k* represented in the global coordinate system. In the following explanation, information indicative of the location generated through this correction may be referred to as location information Pck, and information indicative of the orientation generated through this correction may be referred to as orientation information Dck.

Figure 2D:
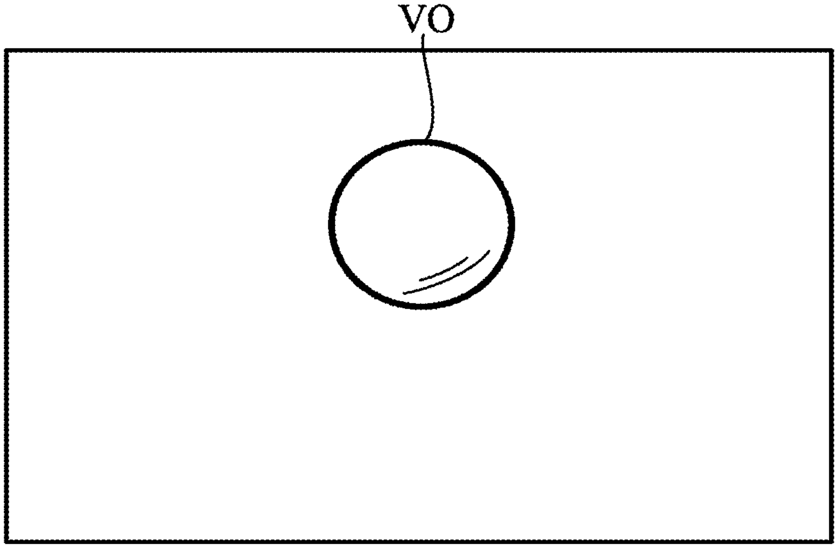
FIG. 2D is an explanatory diagram showing an example of a virtual object image.

When the object management server 50 receives the location information Pck and the orientation information Dck from the user apparatus 10-*k*, the object management server 50 executes a rendering of a virtual object based on the location information Pck and the orientation information Dck. The object management server 50 transmits a virtual object image representing the rendered virtual object to the user apparatus 10-*k*. In this example, the virtual object image is a three-dimensional image. When the user apparatus 10-*k* receives the virtual object image, the user apparatus 10-*k* causes the pair of XR glasses 30-*k* to display the virtual object image. FIG. 2D is an explanatory diagram showing an example of the virtual object image. The virtual object image shown in FIG. 2D is displayed on the pair of XR glasses 30-*k* and the user U[k] visually recognizes the mixed reality space shown in FIG. 2A through the pair of XR glasses 30-*k*.

The object management server 50 manages one or more guide images in association with a virtual object. When the user apparatus 10-*k* approaches a location of the virtual object, the object management server 50 transmits a first guide image selected from the one or more guide images to the user apparatus 10-*k*.

The structure management server 60 manages the space structure data. The space structure data is data indicative of real objects in the real space, the real objects being represented in a mesh structure having a plurality of surfaces. The space structure data is indicated in the global coordinate system.

The space structure data has two main uses. A first use is a use to represent physical phenomena of a virtual object, such as shielding of the virtual object and reflection of the virtual object. For example, when the virtual object is a ball and the ball is thrown toward a wall, the space structure data is used to represent that the ball bounces off the wall. When an obstacle is disposed between a user and the virtual object, the space structure data is used to hide the virtual object. A second use is a use to improve view of a service developer in a state in which the developer determines whether to place a virtual object. The developer sets a reference point in the real space and places the virtual object based on the reference point. The reference point may be referred to as an anchor. The reference point is set on a plane in the real space. Since the space structure data uses the mesh structure to represent the plurality of surfaces, the developer can set the reference point on a surface of a real object disposed in the real space by using the space structure data.

Figure 3:
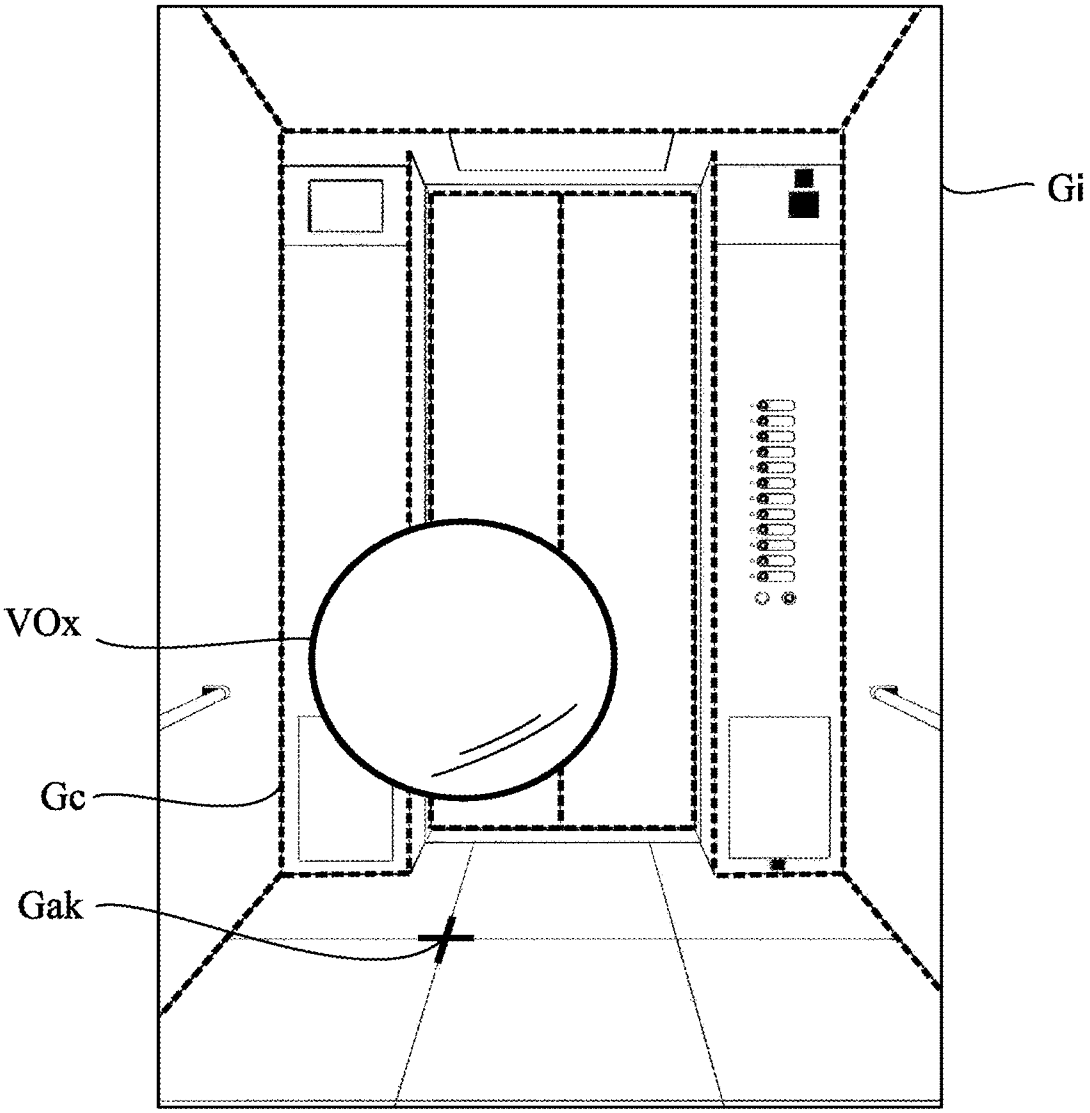
FIG. 3 is an explanatory diagram showing an example of an interface image Gi displayed on a tablet device in a state in which a developer places a virtual object.

FIG. 3 is an explanatory diagram showing an example of an interface image Gi displayed on a tablet device in a state in which the developer places a virtual object. In the example shown in FIG. 3, it is assumed that a virtual object VOx is placed in an elevator hallway. The tablet device for the developer displays a superimposed image. In the superimposed image, a structure image Gc represented by a mesh structure with dotted lines, an anchor image Gak representing a reference point, and the virtual object VOx are each superimposed on an image obtained by the tablet device executing image capture. The reference point is set by the developer. In this case, the tablet device transmits location information indicative of a location of the tablet device, orientation information indicative of an orientation of the tablet device, and a captured image to the object management server 50. The object management server 50 acquires space structure data indicative of a space structure for a vicinity of the tablet device based on the location information and the orientation information. The object management server 50 executes a rendering of a mesh structure based on the acquired space structure data to generate the structure image Gc. In addition, the object management server 50 executes a rendering of the virtual object VOx. The object management server 50 generates the interface image Gi by superimposing the structure image Gc, the anchor image Gak, and the virtual object VOx on the captured image. The object management server 50 transmits the interface image Gi to the tablet device. The developer can adjust a location and orientation of the virtual object VO1 by operating the tablet device. When setting the virtual object VO1 is completed, the tablet device transmits a completion notification to the object management server 50. The object management server 50 stores a location of the reference point and additional data in association with the virtual object VOx. The additional data includes the interface image Gi.

1-1-2: Configuration of Pair of XR Glasses

Figure 4:
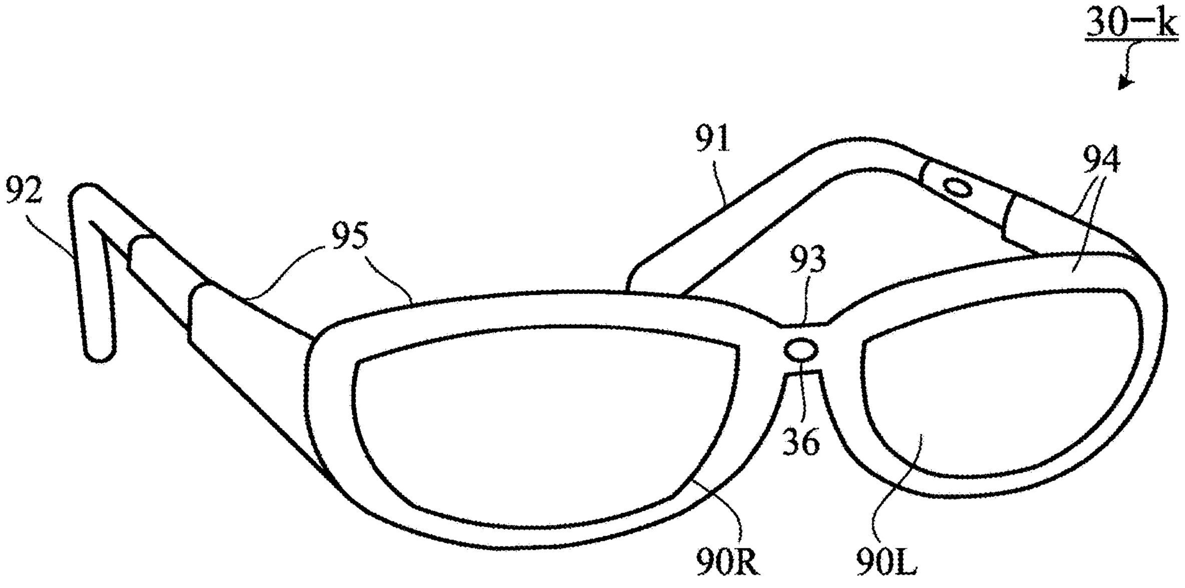
FIG. 4 is a perspective view showing an appearance of the pair of XR glasses 30-*k*.

FIG. 4 is a perspective view showing an appearance of the pair of XR glasses 30-*k*. As shown in FIG. 4, the pair of XR glasses 30-*k*, as well as a typical pair of glasses, has temples 91 and 92, a bridge 93, frames 94 and 95, and lenses 90L and 90R.

The bridge 93 is provided with a capturing device 36. The capturing device 36 is, for example, a camera. The capturing device 36 generates the captured image Gk by capturing the outside world. The capturing device 36 provides the captured image Gk. Each of the lenses 90L and 90R includes a one-way mirror. The frame 94 is provided with either a liquid crystal panel for the left eye of the user or an organic EL panel for the left eye, and with an optical member for guiding light beams, which are emitted by a display panel for the left eye, to the lens 90L. The liquid crystal panel or the organic EL panel is collectively referred to as a display panel. Light beams from the outside world pass through the one-way mirror provided in the lens 90L to be directed to the left eye, and the light beams guided by the optical member are reflected by the one-way mirror to be directed to the left eye. The frame 95 is provided with a display panel for the right eye of the user and with an optical member for guiding light beams, which are emitted by the display panel for the right eye, to the lens 90R. Light beams from the outside world pass through the one-way mirror provided in the lens 90R to be directed to the right eye, and the light beams guided by the optical member are reflected by the one-way mirror to be directed to the right eye.

A display 38, which is described below, includes the lens 90L, the display panel for the left eye, the optical member for the left eye, the lens 90R, the display panel for the right eye, and the optical member for the right eye.

According to the above-described configuration, the user U[k] can watch images displayed by the display panel in a transparent state in which the images are superimposed on images of the outside world. The pair of XR glasses 30-*k* causes the display panel for the left eye to display a left-eye image of stereo-pair images and causes the display panel for the right eye to display a right-eye image of the stereo-pair images. Thus, the pair of XR glasses 30-*k* causes the user U[k] to feel as if the displayed images have depth and have a stereoscopic effect.

Figure 5:
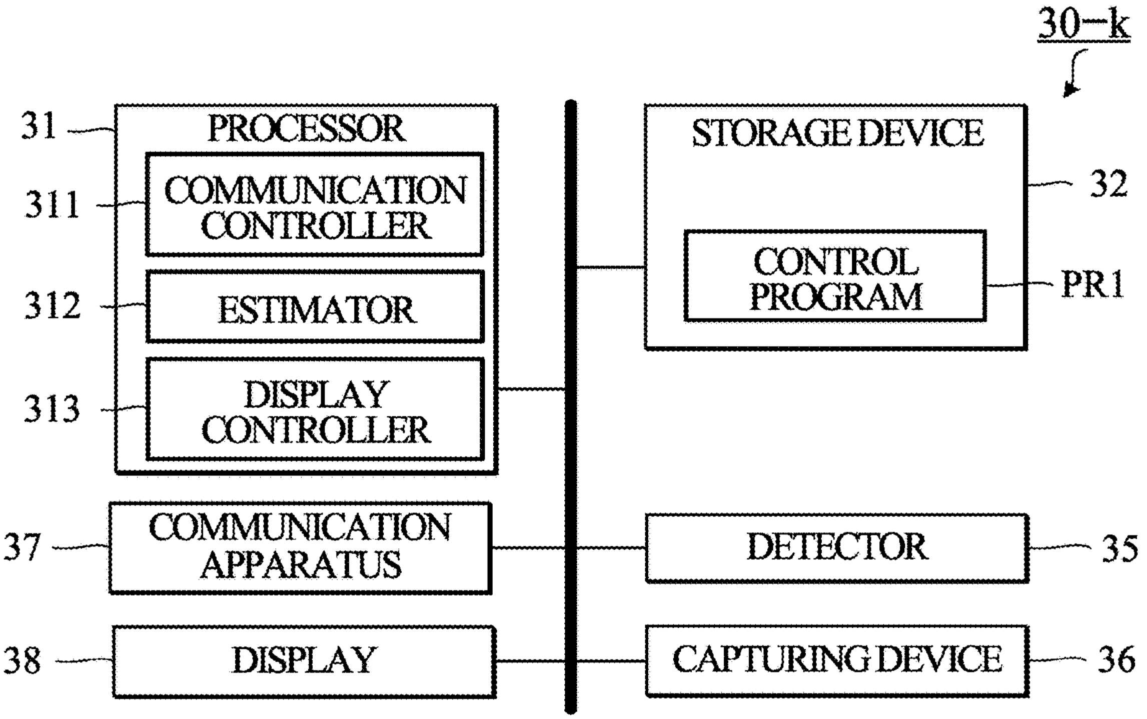
FIG. 5 is a block diagram showing an example of a configuration of the pair of XR glasses 30-*k*.

FIG. 5 is a block diagram showing an example of a configuration of the pair of XR glasses 30-*k*. The pair of XR glasses 30-*k* includes a processor 31, a storage device 32, a detector 35, the capturing device 36, a communication apparatus 37, and the display 38. Each element of the pair of XR glasses 30-*k* is interconnected by a single bus or by multiple buses for communicating information. The term "apparatus" in this specification may be understood as equivalent to another term such as circuit, device, unit, etc.

The processor 31 is a processor configured to control the entire pair of XR glasses 30-*k*. The processor 31 is constituted of a single chip or of multiple chips, for example. The processor 31 is constituted of a central processing unit (CPU) that includes, for example, interfaces for peripheral devices, arithmetic units, registers, etc. One, some, or all of the functions of the processor 31 may be implemented by hardware such as a digital signal processor (DSP), an application specific integrated circuit (ASIC), a programmable logic device (PLD), or a field programmable gate array (FPGA). The processor 31 executes various processing in parallel or sequentially.

The storage device 32 is a recording medium readable and writable by the processor 31. The storage device 32 stores a plurality of programs including a control program PR1 to be executed by the processor 31. The storage device 32 functions as a work area for the processor 31.

The detector 35 detects a state of the pair of XR glasses 30-*k*. The detector 35 includes, for example, an inertial sensor such as an acceleration sensor for sensing acceleration and a gyroscopic sensor for sensing angular acceleration, and a geomagnetic sensor for sensing directions. The acceleration sensor senses acceleration in a direction along an axis that is any one of an X-axis, a Y-axis, and a Z-axis that are perpendicular to one another. The gyroscopic sensor senses angular acceleration of rotation having a rotation axis that is any one of the X-axis, the Y-axis, and the Z-axis. The detector 35 can generate orientation information indicative of an orientation of the pair of XR glasses 30-*k* based on output information from the gyroscopic sensor. Movement information, which is described below, includes acceleration information indicative of acceleration for each of the three axes and angular acceleration information indicative of angular acceleration for each of the three axes. The detector 35 provides the processor 31 with the orientation information indicative of the orientation of the pair of XR glasses 30-*k*, the movement information on movement of the pair of XR glasses 30-*k*, and direction information indicative of a direction of the pair of XR glasses 30-*k*.

The capturing device 36 provides the captured image Gk obtained by capturing the outside world. The capturing device 36 includes lenses, a capturing element, an amplifier, and an AD converter, for example. Light beams focused through the lenses are converted by the capturing element into a captured image signal, which is an analog signal. The amplifier amplifies the captured image signal and provides the amplified captured image signal to the AD converter. The AD converter converts the amplified captured image signal, which is an analog signal, into the captured image information, which is a digital signal. The captured image information is provided to the processor 31. The captured image Gk provided to the processor 31 is provided to the terminal apparatus 20-*k* via the communication apparatus 37.

The communication apparatus 37 is hardware that is a transmitting and receiving device configured to communicate with other devices. For example, the communication apparatus 37 may be referred to as a network device, a network controller, a network card, a communication module, etc. The communication apparatus 37 may include a connector for wired connection, and the object management server 50 corresponding to the connector may include circuitry. The communication apparatus 37 may include a wireless communication interface. The connector for wired connection and an interface circuit for wired connection may conform to wired LAN, IEEE1394, or USB. The wireless communication interface may conform to wireless LAN or Bluetooth (registered trademark), etc.

The display 38 is a device for displaying images. The display 38 displays a variety of types of images under the control of the processor 31.

In the above-described configuration, the processor 31 reads the control program PR1 from the storage device 32. The processor 31 executes the control program PR1 to function as a communication controller 311, an estimator 312, and a display controller 313.

The communication controller 311 causes the communication apparatus 37 to transmit the captured image Gk to the location management server 40 and causes the communication apparatus 37 to receive the location information Pk and the orientation information Dk transmitted from the location management server 40. The communication controller 311 causes the communication apparatus 37 to transmit the captured image Gk and a capture parameter, which includes the location information Pck and the orientation information Dck, to the object management server 50. The communication controller 311 causes the communication apparatus 37 to receive the guide image and the virtual object image transmitted from the object management server 50. Communication between the location management server 40 and the pair of XR glasses 30-*k* and communication between the object management server 50 and the pair of XR glasses 30-*k* are executed via the terminal apparatus 20-*k*.

The estimator 312 corrects the location information Pk and the orientation information Dk periodically received from the location management server 40 based on the orientation information, the movement information, and the direction information provided by the detector 35. This correction allows the estimator 312 to estimate in real time the location information Pck indicative of a location of the pair of XR glasses 30-*k* and the orientation information Dck indicative of an orientation of the pair of XR glasses 30-*k*.

The display controller 313 causes the display 38 to display the guide image and the virtual object image.

1.1.3: Configuration of Object Management Server

Figures 6, 7:
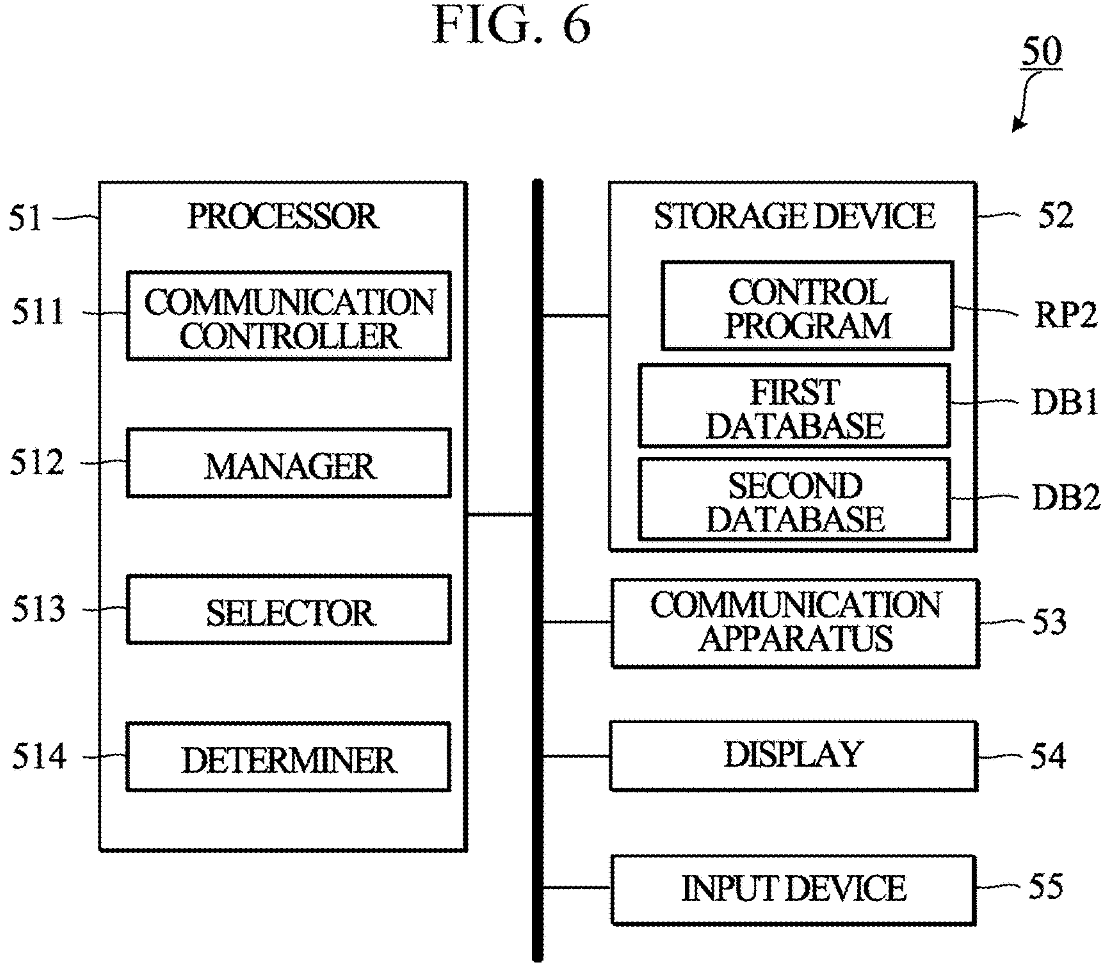
FIG. 6 is a block diagram showing an example of a configuration of an object management server 50.
FIG. 7 is an explanatory diagram showing an example of a data structure of a first database DB1.

FIG. 6 is a block diagram showing an example of a configuration of the object management server 50. The object management server 50 includes a processor 51, a storage device 52, a communication apparatus 53, a display 54, and an input device 55. Each element of the object management server 50 is interconnected by a single bus or by multiple buses for communicating information. The object management server 50 is an example of a guide image management apparatus.

The processor 51 is a processor configured to control the entire object management server 50. The processor 51 is constituted of a single chip or of multiple chips, for example. The processor 51 is constituted of a central processing unit (CPU) that includes, for example, interfaces for peripheral devices, arithmetic units, registers, etc. One, some, or all of the functions of the processor 51 may be implemented by hardware such as a DSP, an ASIC, a PLD, or an FPGA. The processor 51 executes various processing in parallel or sequentially.

The storage device 52 is a recording medium readable and writable by the processor 51. The storage device 52 stores a plurality of programs including a control program PR2 to be executed by the processor 51, a first database DB1, and a second database DB2. The storage device 52 functions as a work area for the processor 51.

The first database DB1 is used to manage virtual objects to be virtually placed by the developer in the real space. FIG. 7 is an explanatory diagram showing an example of a data structure of the first database DB1. The first database DB1 includes a plurality of records. In a record, a virtual object ID, virtual object data, reference point coordinates, relative coordinates, and additional data are in association with one another. The virtual object ID is an identifier for uniquely identifying a virtual object. The virtual object data is data indicative of the virtual object in three dimensions. The reference point coordinates are coordinates of a reference point used to virtually place the virtual object in the real space. The reference point coordinates are represented in the global coordinate system. The relative coordinates are coordinates that indicate a location of the virtual object as a position relative to the reference point coordinates. Use of both the reference point coordinates and the relative coordinates allows a location of the virtual object to be determined in the global coordinate system. The additional data indicates an image in which a structure image Gc with a mesh structure and an anchor image Gak are superimposed on a captured image Gk in a state in which the developer places the virtual object. The additional data is, for example, data indicative of the interface image Gi shown in FIG. 3.

The second database DB2 is used to manage guide images. FIG. 8 is an explanatory diagram showing an example is a data structure of the second database DB2. The second database DB2 includes a plurality of records. In a record, a guide image ID, a virtual object ID, a guide image, a capture parameter, a transmission condition, and an acquisition date and time are in association with one another. The guide image ID is an identifier for uniquely identifying a guide image. The guide image is a two-dimensional image. The capture parameter is information indicative of a capture condition. The capture parameter includes location information Pck indicative of a location at which the guide image is captured and orientation information Dck indicative of an orientation in which the image capture is executed. The location information Pck indicates coordinates in the global coordinate system. The orientation information indicates an azimuth angle and an elevation or depression angle. The azimuth angle of north is 0 degrees, and the azimuth angle increases clockwise. The azimuth angle of east is 90 degrees, and the azimuth angle of south is 180 degrees. The elevation or depression angle is an angle from horizontal upward or downward. The transmission condition indicates a condition for transmitting the guide image to the user apparatus 10-*k*. In this example, the transmission condition for the guide image is a condition in which the user apparatus 10-*k* is within a predetermined area. The acquisition date and time is a date and time at which the guide image was captured or a date and time at which the guide image was registered in the second database DB2.

In the example shown in FIG. 8, a virtual object ID "V001" is in association with a guide image ID "G001" and with a guide image ID "G002." Thus, a single virtual object is in association with two guide images. On the other hand, a virtual object ID "V002" is in association with a guide image ID "G003." Thus, a single virtual object is in association with a single guide image. A condition for transmitting a guide image "001.jpeg" and a condition for transmitting a guide image "002.jpeg" are each a condition in which the user apparatus 10-*k* is within a circle, which has a radius of 50 m and a center that has coordinates (x11, y11, z11).

The communication apparatus 53 shown in FIG. 6 is hardware that is a transmitting and receiving device configured to communicate with other devices. For example, the communication apparatus 53 may be referred to as a network device, a network controller, a network card, a communication module, etc. The communication apparatus 53 may include a connector for wired connection and an interface circuit corresponding to the connector for wired connection. The communication apparatus 53 may include a wireless communication interface.

The display 54 is a device for displaying images and text information. The input device 55 includes, for example, a pointing device such as a keyboard, a touch pad, a touch panel, or a mouse.

The processor 51 reads the control program PR2 from the storage device 52 and executes the control program PR2. As a result, the processor 51 functions as a communication controller 511, a manager 512, a selector 513, and a determiner 514.

The communication controller 511 causes the communication apparatus 53 to transmit the first guide image of the one or more guide images to the user apparatus 10-*k* and causes the communication apparatus 53 to receive, from the user apparatus 10-*k*, a captured image and a capture parameter generated by the user apparatus 10-*k* executing image capture.

The manager 512 manages the one or more guide images in association with a virtual object. Specifically, the manager 512 manages the first database DB1 and the second database DB2. A record included in the first database DB1 and a record included in the second database DB2 are in association with a virtual object ID. The one or more guide images are each obtained by capturing an area of the real space including a location of the virtual object virtually placed in the real space.

When the captured image acquired from the user apparatus 10-*k* satisfies a registration condition, the manager 512 manages the captured image as a new guide image. Specifically, when the captured image satisfies the registration conditions, the manager 512 adds a new record corresponding to the new guide image to the second database DB2. The new record includes a guide image ID, a virtual object ID, the guide image, the capture parameter, and an acquisition date and time.

The registration condition may include a condition in which a captured image Gk does not include a portion that infringes a portrait right. An administrator may view the captured image Gk to determine whether the captured image Gk does not include any portion that infringes a portrait right. Alternatively, the manager 512 may execute the following processing to determine whether a portrait right is infringed. First, the manager 512 executes recognition processing to recognize a human face by analyzing the captured image Gk. Second, the manager 512 executes calculation processing to calculate the ratio of an area of an image of the recognized human face to an area of the entire captured image Gk. Third, the manager 512 executes determination processing to compare the calculated ratio with a predetermined value. In the determination processing, when the ratio is less than the predetermined value, the manager 512 determines that the captured image Gk does not include any portion that infringes a portrait right. In the determination processing, when the ratio is greater than or equal to the predetermined value, the manager 512 determines that the captured image Gk includes a portion that infringes a portrait right.

The manager 512 may use a trained model, which is trained to learn relationships between captured images Gk and infringements of portrait rights, to determine whether the captured image Gk does not include a portion that infringes a portrait right. This trained model is generated in a training phase in which a set of label data and a captured image Gk is used as training data. The label data indicates a determination by the administrator viewing the captured image Gk to determine whether a portrait right is infringed. In an operation phase, when a captured image Gk is input into the trained model, the trained model provides either output data indicating that a portrait right is infringed or output data indicating that a portrait right is not infringed. The manager 512 uses the output data for determination whether the captured image Gk does not include a portion that infringes a portrait right.

The registration condition may include a condition in which a degree of similarity between a captured image Gk and a guide image to be compared among the one or more guide images is less than or equal to a threshold. The manager 512 determines, based on the guide image to be compared, its capture parameter, the captured image acquired from the user apparatus 10-*k*, the location information acquired from the user apparatus 10-*k*, and the orientation information acquired from the user apparatus 10-*k*, whether the captured image Gk satisfies this registration requirement. Specifically, the manager 512 uses a projective transformation matrix to convert the captured image Gk captured at a viewpoint of the pair of XR glasses 30-*k* into a conversion image that is an image of the captured image Gk viewed from a viewpoint at which the guide image to be compared is captured. The manager 512 calculates the projective transformation matrix based on the acquired location information and the acquired orientation information and the capture parameter of the guide image to be compared. The manager 512 calculates a degree of similarity between the conversion image and the guide image to be compared. In the calculation of the degree of similarity, for example, the manager 512 first detects feature points from the conversion image and detects feature points from the guide image to be compared in the same manner. Next, the manager 512 may compare the feature points from the conversion image with the feature points from the guide image to be compared so as to determine the degree of similarity. Thereafter, the manager 512 compares the degree of similarity with the threshold to determine whether the captured image Gk satisfies the registration condition. When the manager 512 registers the new guide image in the second database DB2, the manager 512 deletes a record including the guide image to be compared from the second database DB2. This deletion updates a previous guide image to the new guide image. For example, the guide image G1 shown in FIG. 2B corresponds to the previous guide image, and the guide image G2 shown in FIG. 2C corresponds to the new guide image.

In the above description, the manager 512 uses the projective transformation matrix to convert the captured image Gk; however, the manager 512 may use the projective transformation matrix to convert the guide image to be compared. In this case, the manager 512 may calculate a degree of similarity between the captured image Gk and an image generated by converting the guide image to be compared.

The selector 513 shown in FIG. 6 selects, based on the capture parameter received from the user apparatus 10-*k* and on capture parameters in association with the one or more guide images managed by the manager 512, a guide image captured on a capture condition closest to a capture condition indicated by the capture parameter of the captured image, as the first guide image, from among the one or more guide images.

The determiner 514 determines whether a location of the user apparatus 10-*k* is within the predetermined area. The predetermined area includes the area of the real space in which a virtual object is virtually placed. The predetermined area may be set for each virtual object or may be set for each guide image. Alternatively, the predetermined area may be set for each area in which a plurality of virtual objects is placed. Specifically, the determiner 514 determines whether the location indicated by the location information Pck received by the communication apparatus 53 from the user apparatus 10-*k* is within the predetermined area indicated by the transmission condition.

1.2: Operation of Embodiment

Transmission processing, by which the object management server 50 transmits the first guide image, and update processing, by which the object management server 50 updates the one or more guide images will be described.

1.2.1: Transmission Processing

Figure 9:
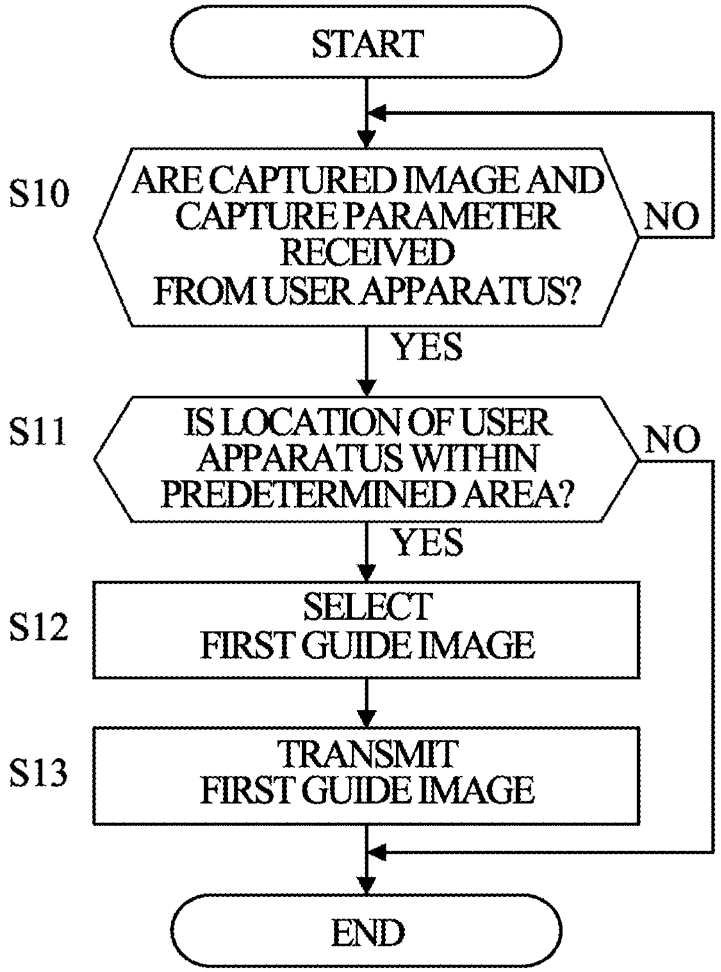
FIG. 9 is a flowchart showing contents of processing by which the object management server 50 transmits a guide image.

FIG. 9 is a flowchart showing contents of processing by which the object management server 50 according to this embodiment transmits the first guide image.

At step S10, the processor 51 determines whether a captured image and a capture parameter are received from the user apparatus 10-*k*. The capture parameter includes the location information Pck and the orientation information Dck. The processor 51 repeats the processing at step S10 until the determination at step S10 is affirmative.

When the determination at step S10 is affirmative, the processor 51 determines whether the location of the user apparatus 10-*k* is within the predetermined area (step S11). Specifically, the processor 51 determines whether the location indicated by the location information Pck acquired via the communication apparatus 53 satisfies a transmission condition for each guide image ID, which is stored in the second database DB2.

When the determination at step S11 is negative, the processor 51 ends the processing. On the other hand, when the determination at step S11 is affirmative, the processor 51 selects a guide image (step S12). When a single transmission condition is satisfied at step S11, the processor 51 selects a guide image for the satisfied transmission condition as the first guide image. On the other hand, when two or more transmission conditions are satisfied at step S11, the processor 51 selects the first guide image from among two or more guide images for the satisfied two or more transmission conditions.

Specifically, the processor 51 executes the following processing. In first processing, the processor 51 reads two or more capture parameters corresponding to two or more guide images ID for the satisfied transmission conditions, from the second database DB2. In second processing, the processor 51 determines a capture condition, which is closest to a capture condition corresponding to the capture parameter received from the user apparatus 10-*k*, from among capture conditions indicated by the read two or more capture parameters. In third processing, the processor 51 determines a guide image ID corresponding to the closest capture condition. In fourth processing, the processor 51 reads, as the first guide image, a guide image corresponding to the determined guide image ID from the second database DB2. The processor 51 executes the first processing to the fourth processing to select the first guide image from among the two or more guide images.

At step S13, the processor 51 causes the communication apparatus 53 to transmit the first guide image to the user apparatus 10-*k*.

In the transmission processing described above, at step S10 and at step S13, the processor 51 functions as the communication controller 511. At step S11, the processor 51 functions as the determiner 514. At step S12, the processor 51 functions as the selector 513.

1.2.2: Update Processing

Figure 10:
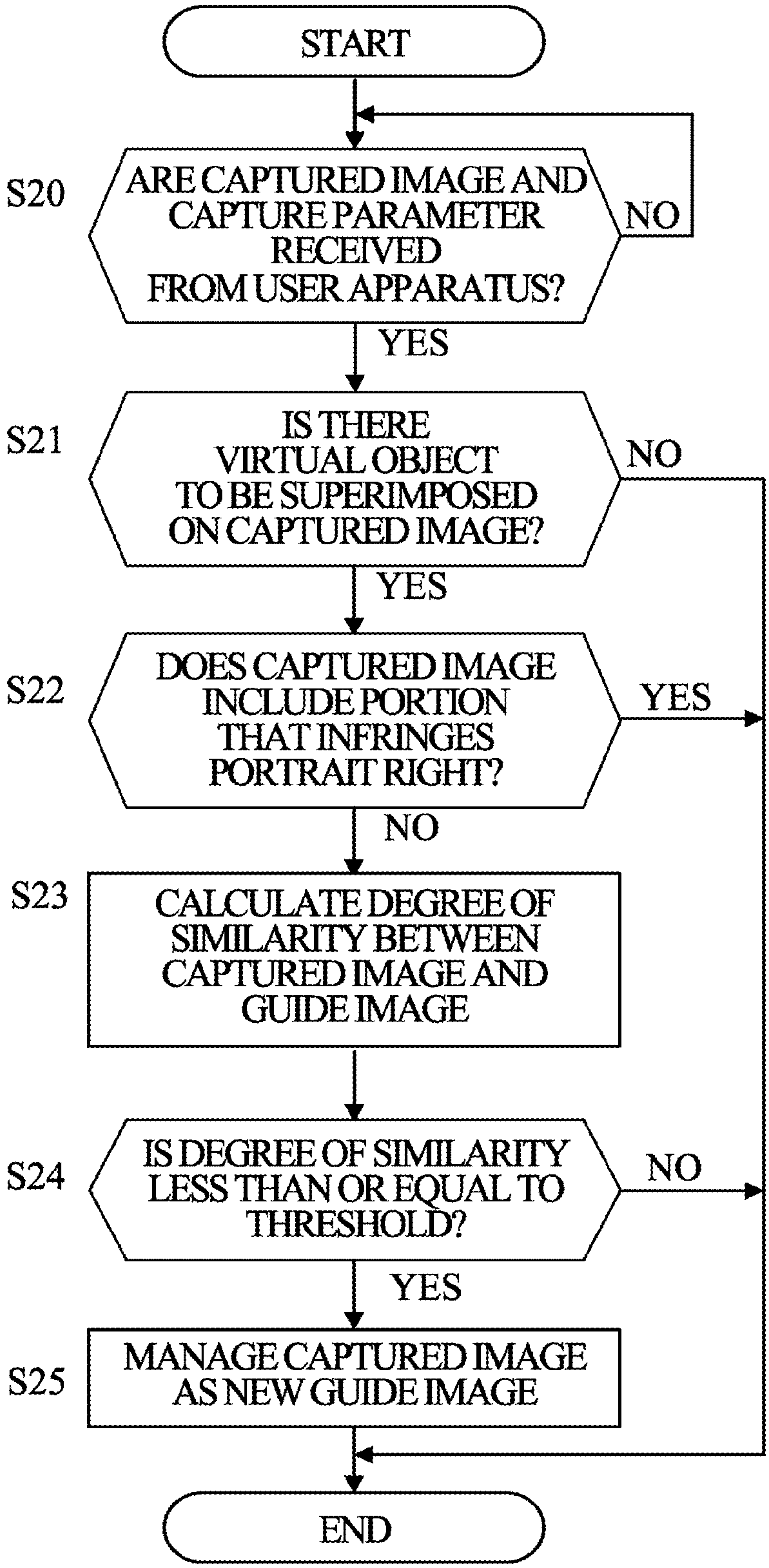
FIG. 10 is a flowchart showing contents of processing by which the object management server 50 updates one or more guide images.

FIG. 10 is a flowchart showing contents of processing by which the object management server 50 updates the one or more guide images.

At step S20, the processor 51 determines whether a captured image Gk and a capture parameter are received from the user apparatus 10-*k*. The capture parameter includes the location information Pck and the orientation information Dck. The processor 51 repeats the processing at step S20 until the determination at step S20 is affirmative.

Figure 11:
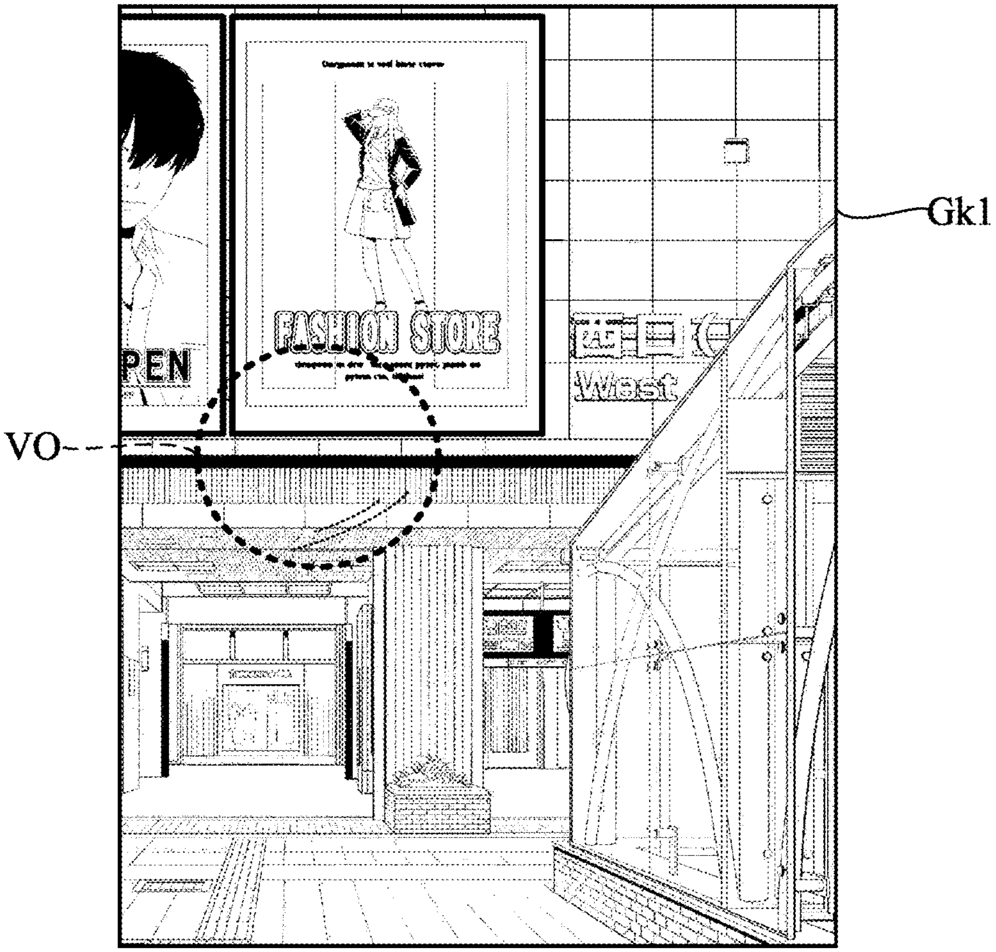
FIG. 11 is an explanatory diagram showing an example of a captured image.

When the determination at step S20 is affirmative, the processor 51 determines whether there is a virtual object to be superimposed on the captured image Gk (step S21). Specifically, the processor 51 determines, based on the orientation information Dck and a location indicated by the location information Pck acquired via the communication apparatus 53, whether a virtual object exists in the field of view of the user U[k]. For example, it is assumed that a captured image Gk shown in FIG. 11 is acquired. In this captured image Gk, the virtual object VO is to be superimposed on an area (part of the field of view of the user U[k]) indicated by a dotted line shown in FIG. 11. Thus, when a captured image Gk for determination at step S21 is the image shown in FIG. 11, the determination at step S21 is affirmative.

When the determination at step S21 is negative, the processor 51 ends the processing. On the other hand, when the determination at step S21 is affirmative, the processor 51 determines whether the captured image Gk includes a portion that infringes a portrait right (step S22). When the determination at step S22 is affirmative, the processor 51 ends the processing. Thus, a captured image Gk, in which a human face is captured to cause infringement of a portrait right, is not adopted as a guide image.

On the other hand, when the determination at step S22 is negative, the processor 51 calculates a degree of similarity between the captured image and a guide image (step S23). In this case, the processor 51 uses the second database DB2 to extract a combination of the guide image (the guide image to be compared) corresponding to an ID of the virtual object to be superimposed on the captured image and a capture parameter corresponding to the ID of the virtual object to be superimposed on the captured image. The processor 51 executes, based on the capture parameter of the captured image and the capture parameter of the guide image, projective transformation on the captured image to generate a conversion image that is an image of the captured image viewed from a viewpoint at which the guide image is captured. The processor 51 calculates the degree of similarity based on the conversion image and the guide image.

In the above-described extraction of the combination of the guide image and the capture parameter, a plurality of combinations may be extracted. For example, it is assumed that contents stored in the second database DB2 are the contents shown in FIG. 8, and it is assumed that the virtual object ID is "V001." In this case, a combination of a guide image and a capture parameter that correspond to the guide image ID "G001" and a combination of a guide image and a capture parameter that correspond to the guide image ID "G002" are extracted. When such a plurality of combinations of guide images and capture parameters is extracted, the processor 51 determines, as a guide image to be compared, a guide image having a capture parameter closest to the capture parameter of the captured image among the extracted plurality of capture parameters. The processor 51 calculates a degree of similarity between the determined guide image to be compared and the captured image.

After the degree of similarity is calculated at step S23, the processor 51 determines whether the degree of similarity is less than or equal to the threshold (step S24). When the determination at step S24 is negative, the processor 51 ends the update processing.

On the other hand, when the determination at step S24 is affirmative, the processor 51 manages the captured image Gk as a new guide image (step S25). Specifically, the processor 51 adds a new record to the second database DB2 and deletes a record corresponding to the previous guide image. The new record includes a guide image ID, a virtual object ID, a guide image, a capture parameter, a transmission condition, and an acquisition date and time.

For example, it is assumed that contents stored in the second database DB2 are the contents shown in FIG. 8, and it is assumed that a guide image ID to be updated is "G003." In addition, in a new record R11, for example, it is assumed that a new guide image ID indicates "G011," a captured image indicates "011.jpeg," a capture parameter indicates a location (x11, y11, z11) and an orientation (a11, b11), a transmission condition indicates a location (x33, y33, z33) and a radius of 15 m, and an acquisition date and time indicates 2022/3/25_16:00. In this case, the processor 51 removes the record R3 shown in FIG. 8 and adds the record R11. As a result, the contents stored in the second database DB2 are updated to contents shown in FIG. 12.

In the above-described update processing, at step S20, the processor 51 functions as the communication controller 511. At steps S21 to S25, the processor 51 functions as the manager 512.

1.3: Effect of Embodiment

According to the above description, the object management server 50 includes the manager 512 and the communication controller 511. The manager 512 manages one or more guide images in association with a virtual object virtually placed in the real space, the one or more guide images being each obtained by capturing an area of the real space including a location of the virtual object. The communication controller 511 causes the communication apparatus 53 to transmit a first guide image of the one or more guide images to the user apparatus 10-*k*, and causes the communication apparatus 53 to receive, from the user apparatus 10-*k*, a captured image Gk generated by the user apparatus 10-*k* executing image capture. The manager 512 manages the captured image Gk as a new guide image when the captured image Gk satisfies a registration condition.

Since the object management server 50 includes the above-described configuration, it is possible to update the one or more guide images using the captured image Gk when an environment of an area around the virtual object is changed. As a result, the object management server 50 can provide a new guide image to a user, allowing the user to use the new guide image as a clue to search for the virtual object.

The communication controller 511 causes the communication apparatus 53 to receive, from the user apparatus 10-*k*, the captured image Gk and a capture parameter related to a condition of capture of the captured image Gk. In a state in which the manager 512 manages the captured image Gk as the new guide image, the manager 512 manages the new guide image and the capture parameter in association with each other. According to the above-described configuration, the object management server 50 can manage a capture condition of a guide image.

The object management server 50 further includes the selector 513. In a state in which the manager 512 manages two or more guide images in association with the virtual object, the selector 513 selects, based on the capture parameter received from the user apparatus 10-*k* and on capture parameters in association with the two or more guide images, a guide image captured on a capture condition closest to a capture condition indicated by the capture parameter of the captured image Gk, as the first guide image, from among the two or more guide images.

According to the above-described configuration, the object management server 50 transmits, to the user apparatus 10-*k*, the first guide image captured on the capture condition closest to the capture parameter received from the user apparatus 10-*k*. Thus, since the first guide image dependent on a state of the user apparatus 10-*k* is transmitted, the user U[k] can readily move to an area in which the virtual object is virtually placed compared to a configuration in which a guide image freely selected from the two or more guide images is transmitted as the first guide image.

The object management server 50 further includes the determiner 514 configured to determine whether the user apparatus 10-*k* is within the predetermined area including the area of the real space in which the virtual object is virtually placed. The communication controller 511 causes the communication apparatus 53 to transmit the first guide image to the user apparatus 10-*k* in response to a determination by the determiner 514 being affirmative, and prohibits the communication apparatus 53 from transmitting the first guide image to the user apparatus 10-*k* in response to the determination by the determiner 514 being negative.

According to the above-described configuration, the object management server 50 transmits the first guide image to the user apparatus 10-*k* only when the user apparatus 10-*k* is within the predetermined area; thus, when the user apparatus 10-*k* approaches the virtual object, the first guide image is transmitted. Consequently, the user U[k] can receive the first guide image when the user U[k] approaches the virtual object. Thus, it is possible to receive the first guide image at a timing at which a guide is required.

The object management server 50 manages the captured image Gk as the new guide image when the captured image Gk satisfies the registration condition. The registration condition includes a condition in which the captured image Gk does not include a portion that infringes a portrait right. Although a human face may be captured in the captured image Gk, the object management server 50 does not manage the captured image Gk that infringes a portrait right as the new guide image; thus it is possible to prevent an infringement of a portrait right in advance.

The object management server 50 manages the captured image Gk as the new guide image when the captured image Gk satisfies the registration condition. The registration condition includes a condition in which a degree of similarity between the captured image Gk and a guide image to be compared among the one or more guide images is less than or equal to the threshold. According to the above-described configuration, when the degree of similarity between the captured image Gk and the guide image to be compared is less than or equal to the threshold, the captured image Gk is managed as the new guide image. Thus, the captured image Gk can be used to update the one or more guide images when it is detected that an environment of an area around the virtual object has been changed.

3: Modifications

This disclosure is not limited to the embodiment described above. Specific modifications will be explained below. Two or more modifications freely selected from the following modifications may be combined.

3.1: First Modification

The user apparatus 10-*k* according to this embodiment includes the terminal apparatus 20-*k* and the pair of XR glasses 30-*k*. The terminal apparatus 20-*k* functions as a relay apparatus configured to relay communication between the pair of XR glasses 30-*k* and the location management server 40, and communication between the pair of XR glasses 30-*k* and the object management server 50. This disclosure is not limited to a configuration in which the user apparatus 10-*k* includes the terminal apparatus 20-*k* and the pair of XR glasses 30-*k*. For example, the pair of XR glasses 30-*k* may have a function of communicating with the location management server 40 and a function of communicating with the object management server 50. In this case, the user apparatus 10-*k* may be included in the pair of XR glasses 30-*k*.

Figure 13:
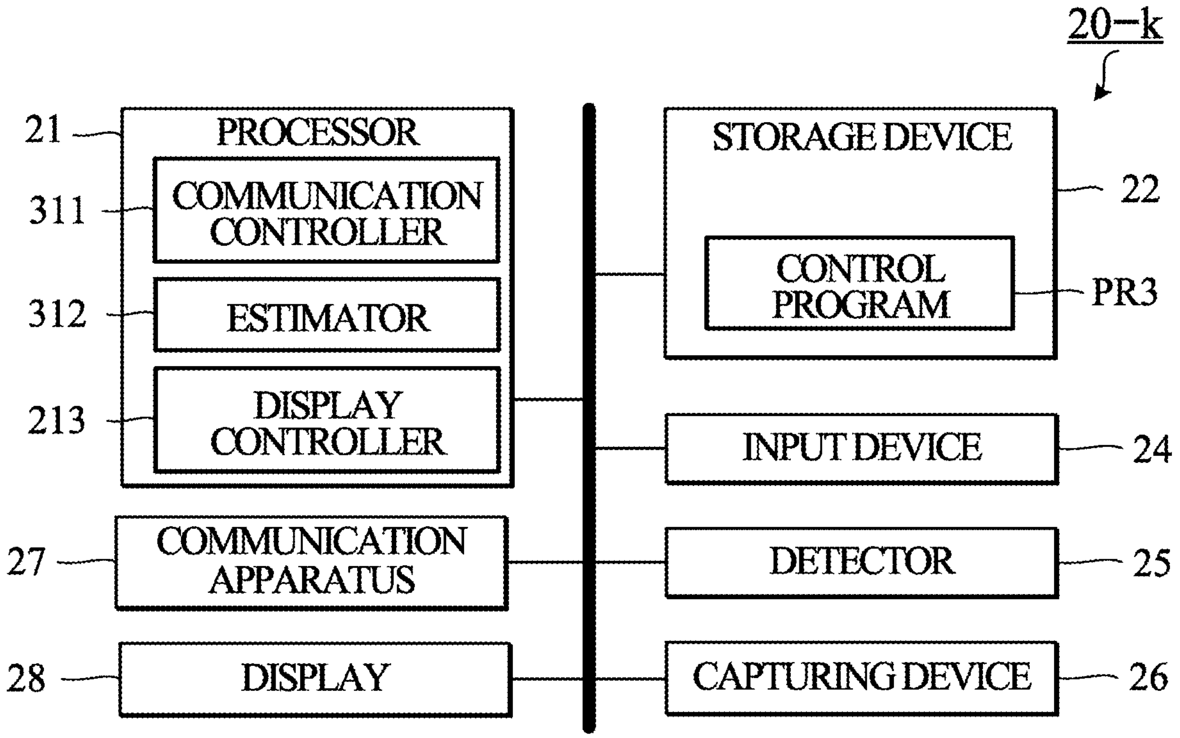
FIG. 13 is a block diagram showing an example of a configuration of a terminal apparatus 20-*k*.

The terminal apparatus 20-*k* may include the functions of the pair of XR glasses 30-*k*. In this case, the user apparatus 10-*k* is constituted of the terminal apparatus 20-*k*. However, the terminal apparatus 20-*k* differs from the pair of XR glasses 30-*k* in that a virtual object is displayed in two dimensions. FIG. 13 is a block diagram showing an example of a configuration of the terminal apparatus 20-*k*. As shown in FIG. 13, the terminal apparatus 20-*k* includes a processor 21, a storage device 22, an input device 24, a detector 25, a capturing device 26, a communication apparatus 27, and a display 28. The processor 21, the storage device 22, the detector 25, the capturing device 26, and the communication apparatus 27 correspond to the processor 31, the storage device 32, the detector 35, the capturing device 36, and the communication apparatus 37, respectively, which are included in the pair of XR glasses 30-*k* shown in FIG. 5. The terminal apparatus 20-*k* has a shape of a flat plate. The capturing device 26 is provided on a surface opposite to the display 28. The processor 21 reads a control program PR3 from the storage device 22. The processor 21 executes the control program PR3 to function as the communication controller 311 and the estimator 312 described above. The processor 21 further functions as a display controller 213. The display controller 213 causes the display 28 to display an image in which the virtual object image is superimposed on a captured image generated by the capturing device 26 executing image capture. The virtual object image is received from the object management server 50 via the communication apparatus 27. The input device 24 is constituted of, for example, a touch panel. In the above-described configuration, the terminal apparatus 20-*k* causes the display 28 to display the first guide image transmitted from the object management server 50. The terminal apparatus 20-*k* transmits the captured image and a capture parameter to the object management server 50. When the received captured image satisfies a registration condition, the object management server 50 uses the captured image to update the one or more guide images.

3.2: Second Modification

In the above-described embodiment, the condition in which the user apparatus 10-*k* is within the predetermined area is used as the transmission condition for the first guide image. When this transmission condition is satisfied, the object management server 50 transmits the first guide image to the user apparatus 10-*k*. However, the transmission condition for the first guide image is not limited to the transmission condition described above. For example, in a state in which the user apparatus 10-*k* displays a map in which icons are placed at different locations of different virtual objects and an icon is selected by the user, the object management server 50 may transmit a first guide image corresponding to the selected icon to the user apparatus 10-*k*.

3.3: Third Modification

In the above-described embodiment, the condition in which the captured image Gk does not include a portion that infringes a portrait right is adopted as the registration condition for the captured image Gk. However, as the registration condition, a condition in which the captured image Gk does not include a portion that infringes a copyright may be adopted. An administrator may view the captured image Gk to determine whether the captured image Gk includes a portion that infringes a copyright.

4: Other Matters (1) In the foregoing embodiment, the storage device 22, the storage device 32, and the storage device 52 are each, for example, a ROM and a RAM; however, the storage devices may include flexible disks, magneto-optical disks (e.g., compact disks, digital multi-purpose disks, Blu-ray (registered trademark) discs, smartcards, flash memory devices (e.g., cards, sticks, key drives), Compact Disc-ROMs (CD-ROMs), registers, removable discs, hard disks, floppy (registered trademark) disks, magnetic strips, databases, servers, or other suitable storage mediums. The program may be transmitted by a network via telecommunication lines. Alternatively, the program may be transmitted by a communication network NET via telecommunication lines.

(2) In the foregoing embodiment, information, signals, etc., may be presented by use of various techniques. For example, data, instructions, commands, information, signals, bits, symbols, chips, etc., may be presented by freely selected combination of voltages, currents, electromagnetic waves, magnetic fields or magnetic particles, light fields or photons.

(3) In the foregoing embodiment, the input and output of information, or the input or the output of information, etc., may be stored in a specific location (e.g., memory) or may be managed by use of a management table. The information, etc., that is, the input and output, or the input or the output, may be overwritten, updated, or appended. The information, etc., that is output may be deleted. The information, etc., that is input may be transmitted to other devices.

(4) In the foregoing embodiment, determination may be made based on values that can be represented by one bit (0 or 1), may be made based on Boolean values (true or false), or may be made based on comparing numerical values (for example, comparison with a predetermined value).

(5) The order of processes, sequences, flowcharts, etc., that have been used to describe the foregoing embodiment may be changed as long as they do not conflict. For example, although a variety of methods has been illustrated in this disclosure with a variety of elements of steps in exemplary orders, the specific orders presented herein are by no means limiting.

(6) Each function shown in FIG. 1 to FIG. 13 may be implemented by any combination of hardware and software. The method for realizing each functional block is not limited thereto. That is, each functional block may be implemented by one device that is physically or logically aggregated. Alternatively, each functional block may be realized by directly or indirectly connecting two or more physically and logically separate, or physically or logically separate, devices (by using cables and radio, or cables, or radio, for example), and using these devices. The functional block may be realized by combining the software with one device described above or with two or more of these devices.

(7) The programs shown in the foregoing embodiment should be widely interpreted as an instruction, an instruction set, a code, a code segment, a program code, a subprogram, a software module, an application, a software application, a software package, a routine, a subroutine, an object, an executable file, an execution thread, a procedure, a function, or the like, regardless of whether it is called software, firmware, middleware, microcode, hardware description language, or by other names.

Software, instructions, etc., may be transmitted and received via communication media. For example, when software is transmitted by a website, a server, or other remote sources, by using wired technologies such as coaxial cables, optical fiber cables, twisted-pair cables, and digital subscriber lines (DSL), and wireless technologies such as infrared radiation and radio and microwaves by using wired technologies, or by wireless technologies, these wired technologies and wireless technologies, wired technologies, or wireless technologies, are also included in the definition of communication media.

(8) In each aspect, the terms "system" and "network" are used interchangeably.

(9) The information and parameters described in this disclosure may be represented by absolute values, may be represented by relative values with respect to predetermined values, or may be represented by using other pieces of applicable information.

(10) In the foregoing embodiment, the terminal apparatuses 10-1 to 10-J, the terminal apparatuses 20-1 to 20-J, and the pairs of XR glasses 30-1 to 30-*j* may each be a mobile station (MS). A mobile station may be referred to, by one skilled in the art, as a "subscriber station", a "mobile unit", a "subscriber unit", a "wireless unit", a "remote unit", a "mobile device", a "wireless device", a "wireless communication device", a "remote device", a "mobile subscriber station", an "access terminal", a "mobile terminal", a "wireless terminal", a "remote terminal", a "handset", a "user agent", a "mobile client", a "client", or some other suitable terms. The terms "mobile station", "user terminal", "user equipment (UE)", "terminal", etc., may be used interchangeably in the present disclosure.

(11) In the foregoing embodiment, the terms "connected" and "coupled", or any modification of these terms, may mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be replaced with "access." As used in this specification, two elements may be considered "connected" or "coupled" to each other by using one or more electrical wires, cables, and printed electrical connections, or by using one or more electrical wires, cables, or printed electrical connections. In addition, two elements may be considered "connected" or "coupled" to each other by using electromagnetic energy, etc., which is a non-limiting and non-inclusive example, having wavelengths in radio frequency regions, microwave regions, and optical (both visible and invisible) regions.

(12) In the foregoing embodiment, the phrase "based on" as used in this specification does not mean "based only on", unless specified otherwise. In other words, the phrase "based on" means both "based only on" and "based at least on."

(13) The term "determining" as used in this specification may encompass a wide variety of actions. For example, the term "determining" may be used when practically "determining" that some act of calculating, computing, processing, deriving, investigating, looking up (for example, looking up a table, a database, or some other data structure), ascertaining, etc., has taken place. Furthermore, "determining" may be used when practically "determining" that some act of receiving (for example, receiving information), transmitting (for example, transmitting information), inputting, outputting, accessing (for example, accessing data in a memory) etc., has taken place. Furthermore, "determining" may be used when practically "determining" that some act of resolving, selecting, choosing, establishing, comparing, etc., has taken place. That is, "determining" may be used when practically determining to take some action. The term "determining" may be replaced with "assuming", "expecting", "considering", etc.

(14) As long as terms such as "include", "including" and modifications thereof are used in the foregoing embodiment, these terms are intended to be inclusive, in a manner similar to the way the term "comprising" is used. In addition, the term "or" used in the specification or in claims is not intended to be the exclusive OR.

(15) In the present disclosure, for example, when articles such as "a", "an", and "the" in English are added in translation, these articles include plurals unless otherwise clearly indicated by the context.

(16) In this disclosure, the phrase "A and B are different" may mean "A and B are different from each other." Alternatively, the phrase "A and B are different" may mean that "each of A and B is different from C." Terms such as "separated" and "combined" may be interpreted in the same way as "different."

(17) The examples and embodiments illustrated in this specification may be used individually or in combination, which may be altered depending on the mode of implementation. A predetermined piece of information (for example, a report to the effect that something is "X") does not necessarily have to be indicated explicitly, and it may be indicated in an implicit way (for example, by not reporting this predetermined piece of information, by reporting another piece of information, etc.).

Although this disclosure is described in detail, it is obvious to those skilled in the art that the present invention is not limited to the embodiment described in the specification. This disclosure can be implemented with a variety of changes and in a variety of modifications, without departing from the spirit and scope of the present invention as defined in the recitations of the claims. Consequently, the description in this specification is provided only for the purpose of explaining examples and should by no means be construed to limit the present invention in any way.

DESCRIPTION OF REFERENCE SIGNS

1 . . . information processing system, 10-1-*j* . . . user apparatus, 11, 21, 51 . . . processor, 13, 23, 53 . . . communication apparatus, 20-1-20-*j* . . . terminal apparatus, 30-1-30-*j* . . . pair of XR glasses, 511 . . . communication controller, 512 . . . manager, 513 . . . selector, 514 . . . determiner, Dck . . . orientation information, Pck . . . location information, G1, G2 . . . guide image, Gk . . . captured image, VO1, VOx . . . virtual object.

The invention claimed is:

1. A guide image management apparatus comprising:

processing circuitry configured to manage one or more guide images in association with a virtual object virtually placed in a real space, the one or more guide images being each obtained by capturing an area of the real space including a location of the virtual object;

cause a communication apparatus to transmit a first guide image of the one or more guide images to a user apparatus; and cause the communication apparatus to receive, from the user apparatus, a captured image generated by the user apparatus executing image capture, wherein the processing circuitry is configured to manage the captured image as a new guide image when the captured image satisfies a registration condition, wherein the processing circuitry is configured to cause the communication apparatus to receive, from the user apparatus, the captured image and a capture parameter related to a condition of capture of the captured image, wherein in a state in which the processing circuitry manages the captured image as the new guide image, the processing circuitry is configured to manage the new guide image and the capture parameter in association with each other, and the processing circuitry is configured, in a state in which the processing circuitry manages two or more guide images in association with the virtual object, based on the capture parameter received from the user apparatus and on capture parameters in association with the two or more guide images, to select a guide image captured on a capture condition closest to a capture condition indicated by the capture parameter of the captured image, as the first guide image, from among the two or more guide images.

2. A guide image management apparatus comprising:

processing circuitry configured to manage one or more guide images in association with a virtual object virtually placed in a real space, the one or more guide images being each obtained by capturing an area of the real space including a location of the virtual object;

cause a communication apparatus to transmit a first guide image of the one or more guide images to a user apparatus; and cause the communication apparatus to receive, from the user apparatus, a captured image generated by the user apparatus executing image capture, wherein the processing circuitry is configured to manage the captured image as a new guide image when the captured image satisfies a registration condition, wherein the processing circuitry is configured to make a determination on whether the user apparatus is within a predetermined area including the area of the real space in which the virtual object is virtually placed, and wherein the processing circuitry is configured to:

in response to the determination being affirmative, cause the communication apparatus to transmit the first guide image to the user apparatus, and in response to the determination being negative, prohibit the communication apparatus from transmitting the first guide image to the user apparatus.

3. The guide image management apparatus according to claim 1, wherein the registration condition includes a condition in which the captured image does not include a portion that infringes a portrait right.

4. The guide image management apparatus according to claim 1, wherein the registration condition includes a condition in which a degree of similarity between the captured image and a guide image to be compared among the one or more guide images is less than or equal to a threshold.

5. The guide image management apparatus according to claim 1, wherein the processing circuitry is configured to make a determination on whether the user apparatus is within a predetermined area including the area of the real space in which the virtual object is virtually placed, and wherein the processing circuitry is configured to:

in response to the determination being affirmative, cause the communication apparatus to transmit the first guide image to the user apparatus, and in response to the determination being negative, prohibit the communication apparatus from transmitting the first guide image to the user apparatus.

6. The guide image management apparatus according to claim 2, wherein the registration condition includes a condition in which the captured image does not include a portion that infringes a portrait right.

7. The guide image management apparatus according to claim 2, wherein the registration condition includes a condition in which a degree of similarity between the captured image and a guide image to be compared among the one or more guide images is less than or equal to a threshold.

* * * * *